United States Patent
Weedon et al.

(10) Patent No.: US 7,681,184 B1
(45) Date of Patent: Mar. 16, 2010

(54) SYSTEM AND METHODOLOGY FOR CROSS LANGUAGE TYPE SYSTEM COMPATIBILITY

(75) Inventors: Jonathan K. Weedon, Nevada City, CA (US); Vijaykumar Natarajan, Santa Clara, CA (US)

(73) Assignee: Borland Software Corporation, Austin, TX (US)

( * ) Notice: Subject to any disclaimer, the term of this patent is extended or adjusted under 35 U.S.C. 154(b) by 1235 days.

(21) Appl. No.: 10/709,705

(22) Filed: May 24, 2004

(51) Int. Cl.
*G06F 9/44* (2006.01)

(52) U.S. Cl. .................................................... 717/137

(58) Field of Classification Search .................. 717/137
See application file for complete search history.

(56) References Cited

U.S. PATENT DOCUMENTS

| | | | |
|---|---|---|---|
| 5,067,072 A | 11/1991 | Talati et al. | 717/148 |
| 5,119,465 A | 6/1992 | Jack et al. | 717/137 |
| 5,142,681 A | 8/1992 | Driscoll et al. | 717/141 |
| 5,175,817 A | 12/1992 | Adams et al. | 709/236 |
| 5,261,077 A | 11/1993 | Duval et al. | 710/306 |
| 5,307,490 A | 4/1994 | Davidson et al. | 719/328 |
| 5,315,703 A | 5/1994 | Matheny et al. | 715/700 |
| 5,339,434 A | 8/1994 | Rusis | 709/246 |
| 5,394,546 A | 2/1995 | Hanatsuka | 707/4 |
| 5,416,917 A | 5/1995 | Adair et al. | 707/203 |
| 5,493,680 A | 2/1996 | Danforth | 717/108 |
| 5,517,645 A | 5/1996 | Stutz et al. | 719/316 |
| 5,546,584 A | 8/1996 | Lundin et al. | 719/315 |
| 5,566,332 A | 10/1996 | Adair et al. | 707/101 |
| 5,581,755 A | 12/1996 | Koerber et al. | 707/103 |
| 5,761,656 A | 6/1998 | Ben-Shachar | 707/4 |
| 5,784,544 A | 7/1998 | Stevens | 358/1.13 |
| 5,848,273 A | 12/1998 | Fontana et al. | 717/108 |
| 5,889,992 A | 3/1999 | Koerber | 717/108 |
| 6,085,203 A | 7/2000 | Ahlers et al. | 715/523 |
| 6,167,565 A * | 12/2000 | Kanamori | 717/146 |
| 6,189,045 B1 | 2/2001 | O'Shea et al. | 709/246 |
| 6,226,649 B1 | 5/2001 | Bodamer et al. | 707/104.1 |
| 6,408,342 B1 * | 6/2002 | Moore et al. | 719/330 |

(Continued)

OTHER PUBLICATIONS

Gosling, J. et al., Java Language Specification, 2nd Ed.(Chapters 1-5), Sun Microsystems, Inc., Mountain View, CA, Jun. 2000.

(Continued)

*Primary Examiner*—Philip Wang
(74) *Attorney, Agent, or Firm*—Kokka & Backus, PC

(57) ABSTRACT

A system and methodology for cross language type system compatibility is described. In one embodiment, for example, a system for translation of data types between a first application in a first language and a second application in a second language is described that comprises: a formal mapping between data types of the first language and data types of the second language; translators for translating data types between the first language and the second language based on the formal mapping; a translation mapping to the translators based on actual data types of the first application and formal data types of the second application; and a module for selecting an appropriate translator for translating between a particular data type in the first language and a data type in the second language based on the translation mapping in response to invocation of a method of the first application with the particular data type.

39 Claims, 7 Drawing Sheets

U.S. PATENT DOCUMENTS

| | | | |
|---|---|---|---|
| 6,574,673 B1 | 6/2003 | Hari et al. | 719/310 |
| 6,813,770 B1 | 11/2004 | Allavarpu et al. | 719/316 |
| 6,915,324 B1 | 7/2005 | Allavarpu et al. | 709/200 |
| 6,983,458 B1 | 1/2006 | Honda | 717/151 |
| 7,035,781 B1 | 4/2006 | Flake et al. | 703/14 |
| 7,058,645 B2 | 6/2006 | Seto et al. | 707/101 |
| 7,096,422 B2 | 8/2006 | Rothschiller et al. | 715/513 |
| 2004/0103405 A1* | 5/2004 | Vargas | 717/137 |
| 2004/0123275 A1* | 6/2004 | Brown et al. | 717/136 |
| 2004/0177360 A1* | 9/2004 | Beisiegel et al. | 719/316 |
| 2005/0240943 A1* | 10/2005 | Smith et al. | 719/328 |

OTHER PUBLICATIONS

Gosling, J. et al., The Java Language Environment, A White Paper, Sun Microsystems Computer Company, Oct. 1995.

* cited by examiner

SYSTEM AND METHODOLOGY FOR CROSS LANGUAGE TYPE SYSTEM COMPATIBILITY

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description SourceCode.txt, size 2.89 KB, created May 20, 2004 2:37 pm; Object ID: File No. 1; Object Contents: Source Code.

BACKGROUND OF INVENTION

1. Field of the Invention

The present invention relates generally to information processing environments and, more particularly, to a system and methodology for cross language type system compatibility.

2. Description of the Background Art

Before a digital computer may accomplish a desired task, it must receive an appropriate set of instructions. Executed by the computer's microprocessor, these instructions, collectively referred to as a "computer program", direct the operation of the computer. Expectedly, the computer must understand the instructions which it receives before it may undertake the specified activity.

Owing to their digital nature, computers essentially only understand "machine code", i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C++, Pascal, or more recently Java and C#. These languages allow data structures and algorithms to be expressed in a style of writing that is easily read and understood by fellow programmers.

A program called a "compiler" translates these instructions into the requisite machine language. In the context of this translation, the program written in the high-level language is called the "source code" or source program. The ultimate output of the compiler is a compiled module such as a compiled C++"object module", which includes instructions for execution ultimately by a target processor, or a compiled Java class, which includes bytecodes for execution ultimately by a Java virtual machine. A Java compiler generates platform-neutral "bytecodes", an architecturally neutral, intermediate format designed for deploying application code efficiently to multiple platforms.

Integrated development environments, such as Borland's JBuilder® and C# Builder, are the preferred application development environments for quickly creating production applications. Such environments are characterized by an integrated development environment (IDE) providing a form painter, a property getter/setter manager ("inspector"), a project manager, a tool palette (with objects which the user can drag and drop on forms), an editor, a debugger, and a compiler. In general operation, the user "paints" objects on one or more forms, using the form painter. Attributes and properties of the objects on the forms can be modified using the property manager or inspector. In conjunction with this operation, the user attaches or associates program code with particular objects on the screen (e.g., button object). Typically, code is generated by the IDE in response to user actions in the form painter and the user then manipulates the generated code using the editor. Changes made by the user to code in the editor are reflected in the form painter, and vice versa. After the program code has been developed, the compiler is used to generate binary code (e.g., Java bytecode) for execution on a machine (e.g., a Java virtual machine).

Although integrated development environments facilitate the development of applications, issues remain in the development and use of such applications. One issue is that as enterprise applications expand in scope and capabilities, it is often desirable to be able to send objects and data across programming language boundaries. In particular, it may be desirable to construct a set of objects in one language (for example, a client application in C#), and send that set of objects to a component implemented in a second language (for example, a server application implemented in Java). Typically, when developing applications in such a multi-language environment, a single set of shared data types will be designed, and then implemented (or code generated) in all participating languages, such that the same set of data types are accessible to all applications, in all languages.

However, there are situations where it is not possible, or not sensible, to define the same data types in all languages. In such situations, it would be preferable to use the set of data types that already exist in the participating languages, and to map the underlying data from the preexisting data types in one language, to the preexisting data types in the other language. In such a system, there is not one type system (mapped to all participating languages) but two or more type systems (existing independently in each participating language).

A concrete example of such a requirement is when passing collection-valued data between two languages that each provides a library of built-in collection-valued data types. For example, consider constructing an instance of System.Collections.ArrayList in C#. If such an object is sent to a Java application, the Java application would expect to receive an instance of java.util.ArrayList. Likewise, if a Java application sends an instance of java.util.ArrayList, the C# recipient would expect an instance of System.Collections.ArrayList.

A number of challenges arise when building systems supporting such cross-language type conversions. One of the challenges derives from the fact that the type systems defined in each language may be incompatible. To illustrate the problem, consider a server implemented in Java, with the following method signature:

Java: void sendInfo(java.util.ArrayList info);

If one were to access this method definition from C#, the corresponding client signature would be:

C#: void sendInfo(System.Collections.ArrayList info);

It should then be possible for a C# client to send a System.Collections.ArrayList of information to the server, and for the server to receive a java.util.ArrayList.

However, a difficulty arises in cases involving a different method signature defined in Java such as the following:

Java: void sendMoreInfo(Java.util.Vector moreInfo);

If one were to access this second method definition from C#, the corresponding client signature would be:

C#: void sendMoreInfo(System.Collections.ArrayList moreInfo);

Note that in this example, while the server is expecting to receive an instance of type java.util.Vector, the client is still sending an instance of System.Collections.ArrayList, just as in the first example. This discrepancy is due to the fact that there are multiple data types in Java that correspond semantically to a single data type in C#.

So, one can observe that there is the potential for a one-to-many mapping between data types defined in one language (e.g., System.Collections.ArrayList in C#) and the corresponding data types defined in another language (e.g., both java.util.ArrayList and java.util.Vector in Java). In general, there may be a many-to-many mapping between data types defined in different languages.

Prior solutions have relied on an isomorphic mapping between the type systems of the various languages. That is, prior solutions have assumed that there exists a one-to-one mapping between the types used in one language, and the types used in other languages. This isomorphic mapping is then typically implemented via a code generator (as is typically the case in RPC-based systems, such as DCE or CORBA) or by way of programmer conventions. For example, a "master" type system may be specified for use by all programmers (developers) developing applications in this type of multiple-language environment. For components written in languages that do not directly support a given "master" data type, the developer writing the component is typically responsible for converting the data appropriately to (and from) the master data type.

This isomorphic mapping requirement limits the flexibility and usability of such prior art systems, in that the developer must be aware of the type system requirements of the other language(s) being used in the system. In particular, the developer must take care to avoid using data types in ways that are valid in the source language, but invalid in the target language. Conversely, the developer may not be able to perform operations that require the use of data types in ways that are invalid in the source language, but are valid in the target language. In short, the developer must be fully aware of the type requirements of both languages, and develop applications exclusively using data types in ways that are valid in both the source and the target languages.

What is needed is a technique for automating the conversions, such that applications can be developed using the local (or source) language's type system, without requiring knowledge of (and without limitations based on the requirements of) the target language's type system. Ideally, the solution should automatically determine the optimal type for the target language based on knowledge of both the actual type in the source language and the formal type in the target language. The present invention provides a solution for these and other needs.

SUMMARY OF INVENTION

A system and methodology for cross language type system compatibility is described. In one embodiment, for example, a system of the present invention for translation of data types between a first application in a first language and a second application in a second language is described that comprises: a formal mapping between data types of the first language and data types of the second language; translators for translating data types between the first language and the second language based on the formal mapping; a translation mapping to the translators based on actual data types of the first application and formal data types of the second application; and a module for selecting an appropriate translator for translating between a particular data type in the first language and a data type in the second language based on the translation mapping in response to invocation of a method of the first application with the particular data type.

In another embodiment, for example, a method of the present invention is described for translation of data types between a first component in a first language and a second component in a second language, the method comprises steps of: defining a formal mapping between data types of the first language and data types of the second language; implementing translators based on the formal mapping for translating data types between the first language and the second language; producing a programming interface for the first component based upon the formal mapping and the second component's programming interface; generating a translation mapping to the translators based on actual data types of the first component and formal data types of the second component as defined in the first component's programming interface; in response to invocation of a method defined in the first component's programming interface with a particular data type, selecting a translator based on the translation mapping and the particular data type; and translating the particular data type to a data type of the second language using the selected translator.

DETAILED DESCRIPTION

Glossary

Figure 1:
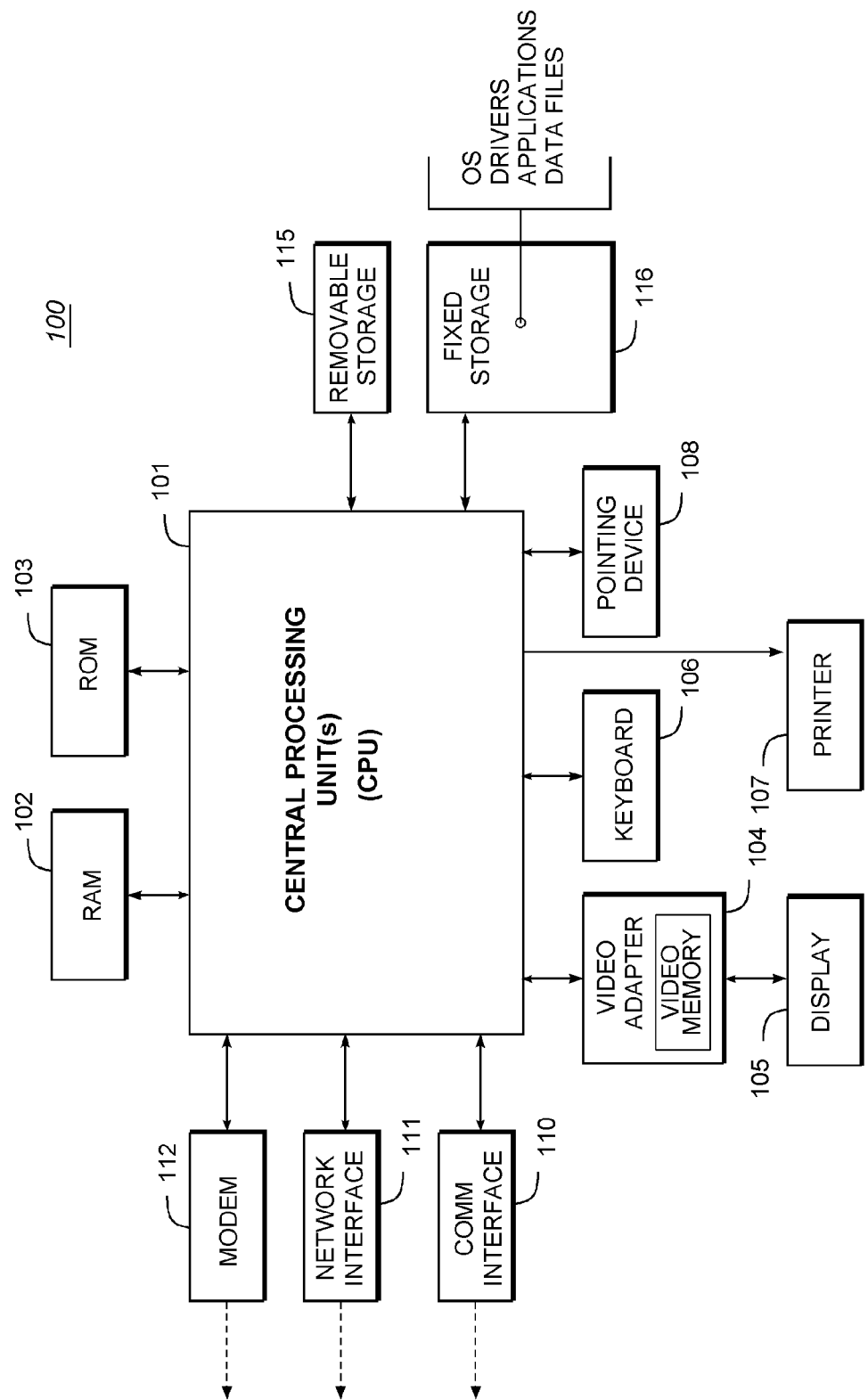
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Bytecode: A virtual machine executes virtual machine low-level code instructions called bytecodes. Both the Sun Microsystems Java virtual machine and the Microsoft NET virtual machine provide a compiler to transform the respective source program (i.e., a Java program or a C# program, respectively) into virtual machine bytecodes.

Compiler: A compiler is a program which translates source code into binary code to be executed by a computer. The compiler derives its name from the way it works, looking at the entire piece of source code and collecting and reorganizing the instructions. Thus, a compiler differs from an interpreter which analyzes and executes each line of code in succession, without looking at the entire program. A "Java compiler" translates source code written in the Java programming language into bytecode for the Java virtual machine.

Data type: A data type in a programming language is a set of data with values having predefined characteristics. Examples of data types include integers, characters, and strings. Usually, a number of such data types come built into a programming language. The language usually specifies the range of values for a given data type, how the values are processed by the computer, and how they are stored. The particular system by which data are organized in a program is the type system of the programming language. With object-oriented programming, a programmer can also create new data types to meet application needs. Such an exercise as known as "data abstraction" and the result is a new class of data. Such a class typically draws upon the "built-in" data types such as integers and characters. For example, a class could be created that would abstract the characteristics of a purchase order. The purchase order data type would contain the more basic data types of numbers and characters and could also include other objects defined by another class.

Introspection: Studying a component or run-time code with reflection (see below) to discover its properties; for example, one may study a Java "bean" component using the Java Reflection API to discover its properties.

Java: Java™ is a general purpose programming language developed by Sun Microsystems. Java is an object-oriented language similar to C++, but simplified to eliminate language features that cause common programming errors. Java source code files (files with a .java extension) are compiled into a format called bytecode (files with a .class extension), which can then be executed by a Java interpreter. Compiled Java code can run on most computers because Java interpreters and runtime environments, known as Java virtual machines (VMs), exist for most operating systems, including UNIX, the Macintosh OS, and Windows. Bytecode can also be converted directly into machine language instructions by a just-in-time (JIT) compiler. Further description of the Java Language environment can be found in the technical, trade, and patent literature; see e.g., Gosling, J. et al., "The Java Language Environment: A White Paper," Sun Microsystems Computer Company, October 1995, the disclosure of which is hereby incorporated by reference. For additional information on the Java programming language (e.g., version 2), see e.g., "Java 2 SDK, Standard Edition Documentation, version 1.4.2," from Sun Microsystems, the disclosure of which is hereby incorporated by reference. A copy of this documentation is available from Sun Microsystems, Inc, of Santa Clara, Calif., U.S.A.

Network: A network is a group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term "network" refers broadly to any group of two or more computer systems or devices that are linked together from time to time (or permanently).

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
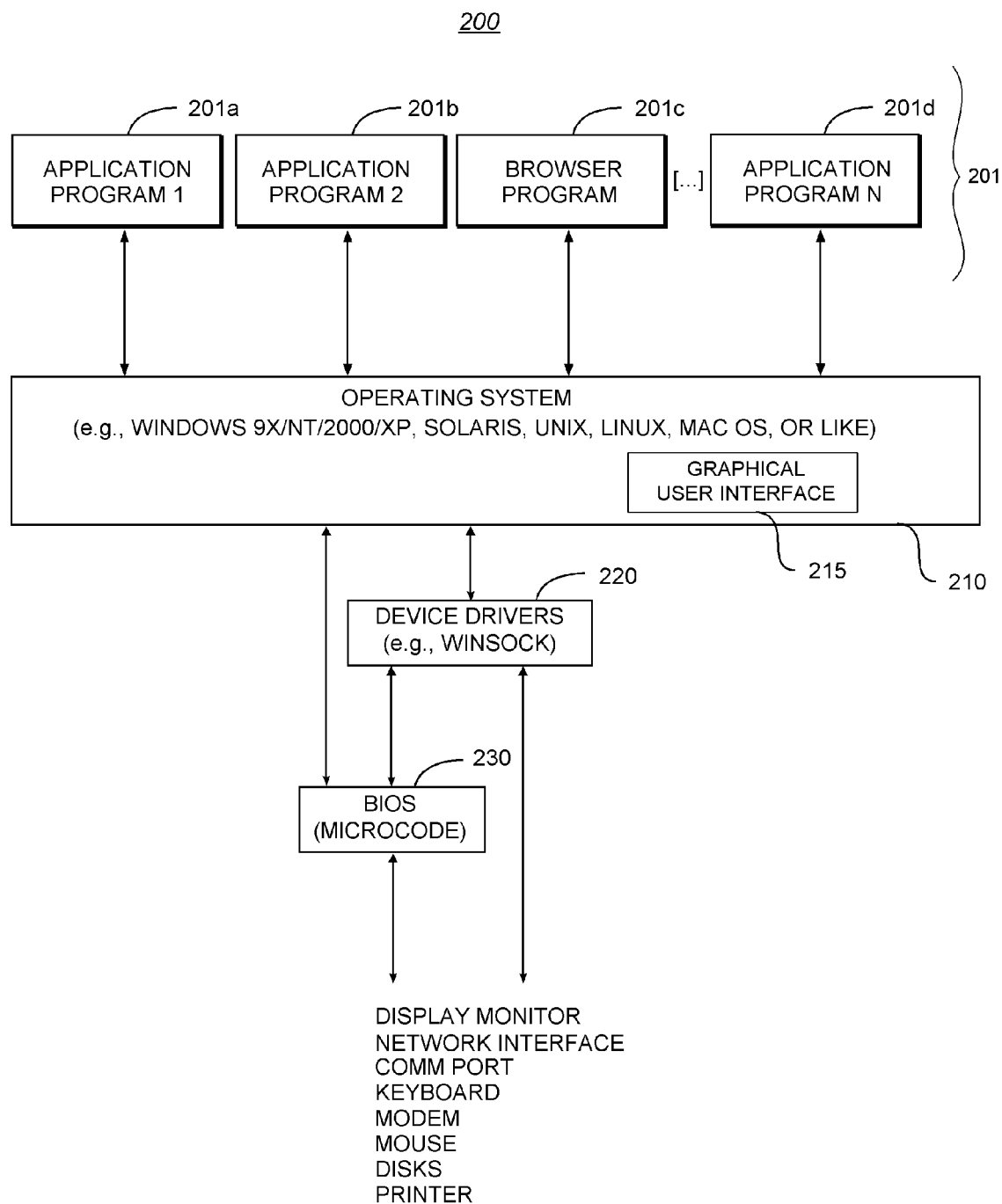
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of down-loadable processor-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

For purposes of discussion, the following description will present examples of a first (or "client") component written in the C# programming language communicating with a second (or "server") component written in the Java language. However, the present invention is not specific to C# and/or Java™ and may also be used with a number of other programming languages. In addition, a client/server distinction is not necessary to the invention, but is used to provide a framework for discussion. Instead, the present invention may be implemented in any type of system architecture or processing environment capable of supporting the methodologies of the present invention presented in detail below.

Overview of System and Methodology for Cross Language Type System Compatibility

In modern application development there is often a need to build systems using more than one programming language. For example, a developer writing a client component of an application in C# may wish to utilize services provided by a server component (e.g., on another machine) that is written in Java. It should be noted that although this example refers to a client and a server, the same situation may also arise in the case of a single process on a single machine where portions of an application are written using one language and other portions of the application are written using a different language. A challenge in developing programs in this type of multiple language environment is that each language may include specialized data types. Moreover, data types defined in one language may be incompatible with those in another language. For example, although simple data types such as strings, integers, dates, and so forth are shared across many programming languages, more complex data types such as collections or other structural data types are often different in different languages and programming environments. As discussed previously, prior solutions for mapping data from data types of one language to another language have traditionally relied on a one-to-one mapping between data types. This isomorphic mapping requirement limits the flexibility and usability of such systems, in that the developer developing a program in one language must be aware of the type system requirements of the other language (or languages) being used.

The present invention enables a programmer (e.g., application developer) developing a program in this type of multiple language environment to use the familiar, native data types of a given programming language without concern about the type system requirements of other languages. The system and methodology of the present invention provides for translation of data types from a "source" language to a "target" language (and vice versa) in a manner that does not place restrictions on the data types that can be used in the individual languages and does not force a developer working in one language to use the data types of another language. More particularly, the present invention provides a mechanism for determining the optimal data type to provide, given (a) the formal data type (e.g., the data type required by the target) and (b) the actual data type (e.g., the data type provided by the source).

The operations of the present invention are transparent to the user (e.g., a developer writing an application in a given programming language). The developer may write a component using the native data types of a given language, without any need to be concerned about the corresponding data types in other languages. For example, a component written in C# may pass a list of customers to another application component written in Java, however the C# and Java components may have different data types for representing this list of customers. The approach of the present invention does not force the developer to apply constraints regarding the use of the native data types so as to maintain compatibility with data types of other programming languages. Using this same example, the C# programmer can develop the C# component using the native C# data types that he or she deems appropriate. The system of the present invention provides an intermediary for automatically translating the data types from a source language (e.g., C#) to a target language (e.g., Java) in a manner that is flexible and correct. Significantly, the system identifies the optimal target data type in the target language (e.g., Java) that should be used for translation based upon the data type provided by the source language (e.g., C#). A discussion of the environments in which the system of the present invention may be implemented and the basic design of the currently preferred embodiment of the system follows.

System Components

Figure 3:
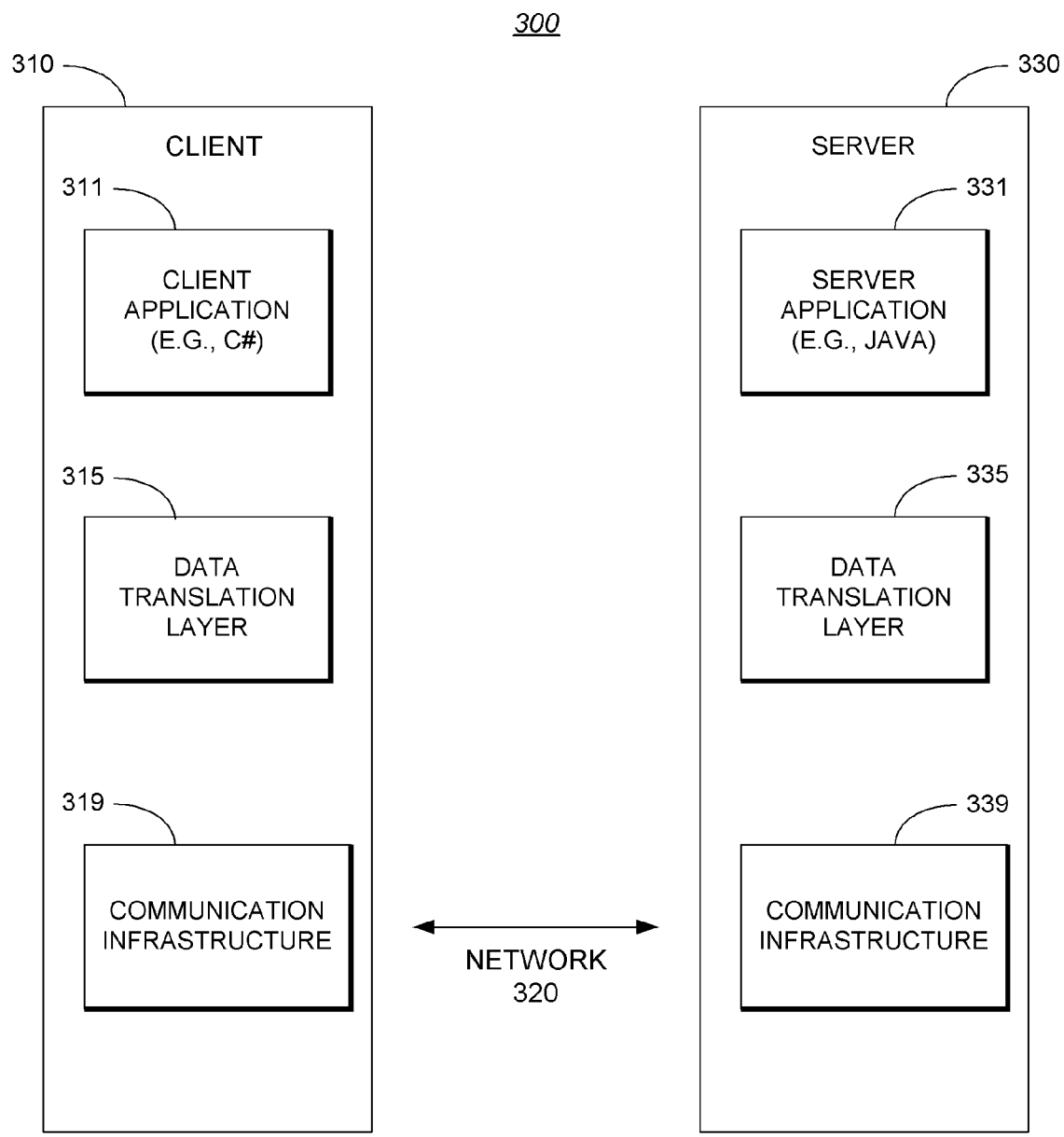
FIG. 3 is a high-level block diagram of an environment in which the system of the present invention may be embodied.

FIG. 3 is a high-level block diagram of an environment 300 in which the system of the present invention may be embodied. As shown, environment 300 includes a client machine 310 and a server machine 330 connected via a network 320. As shown, a client application 311 (e.g., developed in the C# programming language) resides on top of a data translation layer 315 and a communication infrastructure layer 319 at the client 310. The client 310 communicates over a network 320 to the server 330, which is essentially a peer of the client having a similar architecture. Specifically, a server application 331 (e.g., developed in the Java programming language), a data translation layer 335, and a communication infrastructure layer 339 are in operation at the server 330. In this type of distributed system environment, the methodology of the present invention is implemented in the data translation layer 315 at the client 310 and the data translation layer 335 at the server 330. In both cases, the data translation layer determines the appropriate target Java data types (given a source object of the other type) and then appropriately translates data to the appropriate target data type as hereinafter described.

Figure 4:
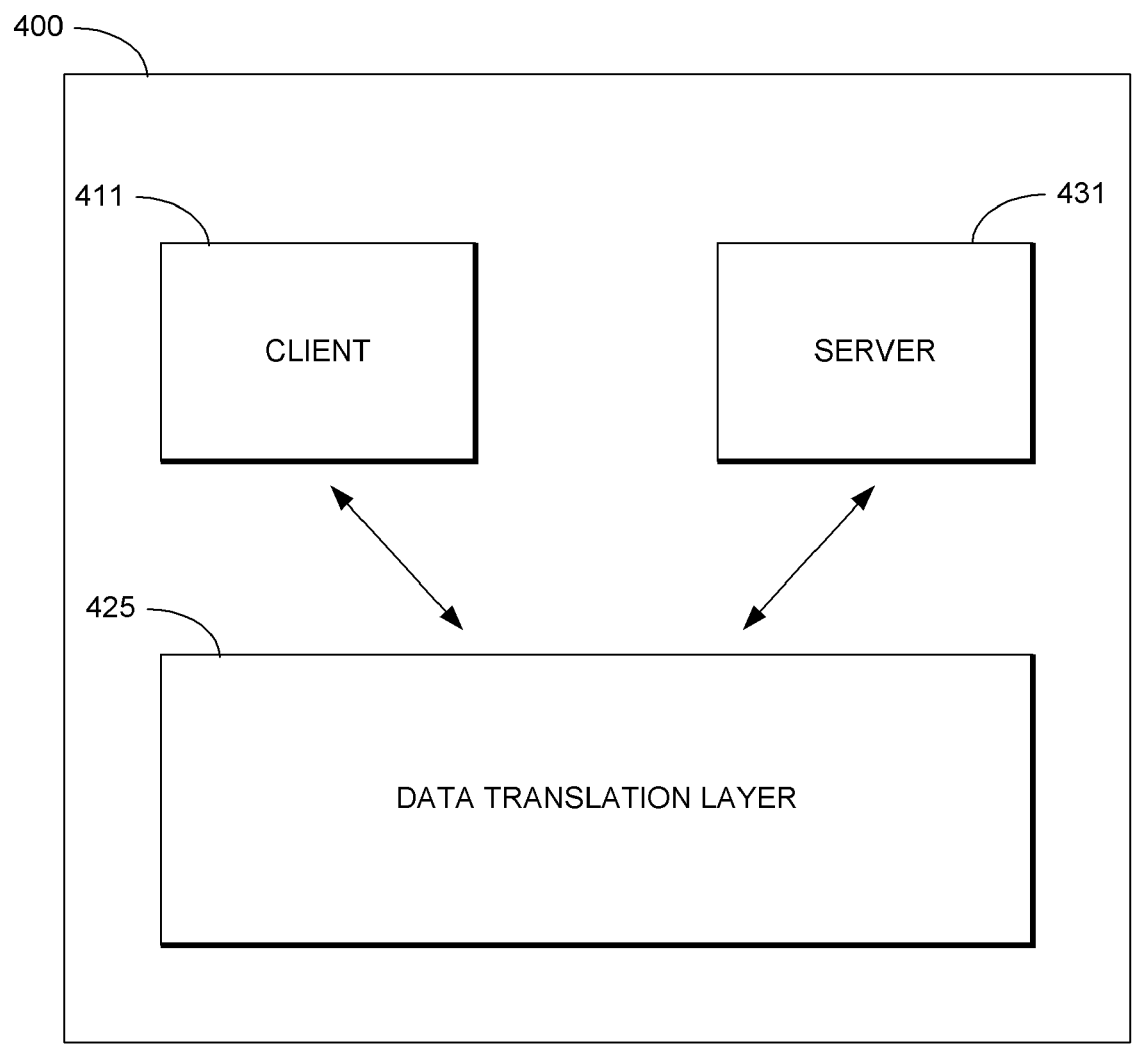
FIG. 4 illustrates an alternative embodiment in which the present invention is implemented in a single process.

FIG. 4 illustrates an alternative embodiment in which the present invention is implemented in a single process 400. As shown at FIG. 4, a data translation layer 425 serves as the intermediary between a client component 411 (e.g., programmed in the C# language) and a server component 431 (e.g., programmed in the Java language) within a single process. As another alternative (not shown), the data translation layer may serve as an intermediary between a client application and a server application on a single machine.

Referring, for example, to FIG. 4, the client 411 written in the C# language may wish to invoke a method or service provided by the server component 431. However, the server 431 is written in the Java language and therefore utilizes a different type system than the client 411. The client 411 would seek to invoke the service (e.g., the server 431) and would pass data to which is defined as a C# data type (e.g., a C# list). The server 431, on the other hand, is expecting a Java list. The data translation layer 425 serves as an intermediary between the two. The data translation layer 425 determines how best to translate from one to another and performs the appropriate translation. For example, when invoked by the client 411 with a C# list, the data translation layer 425 initially determines the appropriate target data type (i.e., the Java data type). The data translation layer 425 reads the client data type (e.g., C# list) into an internal format, and then writes the data to the appropriate server data type (e.g., Java list) from the internal format. Of particular interest, during this process the data translation layer 425 determines the optimal reader/writer object to use for the translation which provides the best mapping between the data types of the two languages. As a given data type of a source language may possibly map to a plurality of data types of a target language, the present invention provides for selecting the optimal target data type given a particular source data type as hereinafter described in greater detail.

The data translation layer includes a core converter object, known as a "Translator", which is capable of constructing a data value in one type system given a data value in another type system (and vice versa). In the currently preferred embodiment, one of the type systems is C#, and another type system is Java. However, those skilled in the art will appreciate that the present invention is not limited to use in conjunction with these two languages and can also be used in connection with a number of other programming languages and environments.

Each Translator object is registered using pair-wise combinations of the actual (or source) type (in the client language) and the formal (or target) type (in the server language). These registrations occur in two directions: (1) from the client language to the server language, and (2) from the server language to the client language.

When sending a data value from the client language to the server language, the methodology of the present invention initially provides for looking for a Translator object corresponding to the combination of the actual type (source type) and the formal type (target type). If a match is found, that Translator object is used for the data conversion. However, if a match is not found, a search is performed through all of the supported types of the actual type (that is, in Java or C# search through all interfaces supported by the actual type, and all base classes of the actual type). For each supported type of the actual type (source type), the system looks for a Translator object corresponding to the combination of the supported type of the actual type and the formal type (target type). This search proceeds until a match is found (at which point that Translator is used for the data conversion), or until it is determined that no possible match exists (at which point a failure occurs, indicating that the required data conversion is not possible). In a properly configured implementation of the present invention, such failures should not occur, as all valid data conversions should have a corresponding Translator registered with the system.

It should be noted that the data conversion methodology of the present invention is symmetric. That is, the same method applies when sending data (back) from the server language to the client language. In such cases, the actual type (or source type) would correspond to the data value created in the server language environment, and the formal type (or target type) would correspond to the method signature as defined in the client language environment.

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Set Up of System for Type System Translation Across Languages

Figure 5:
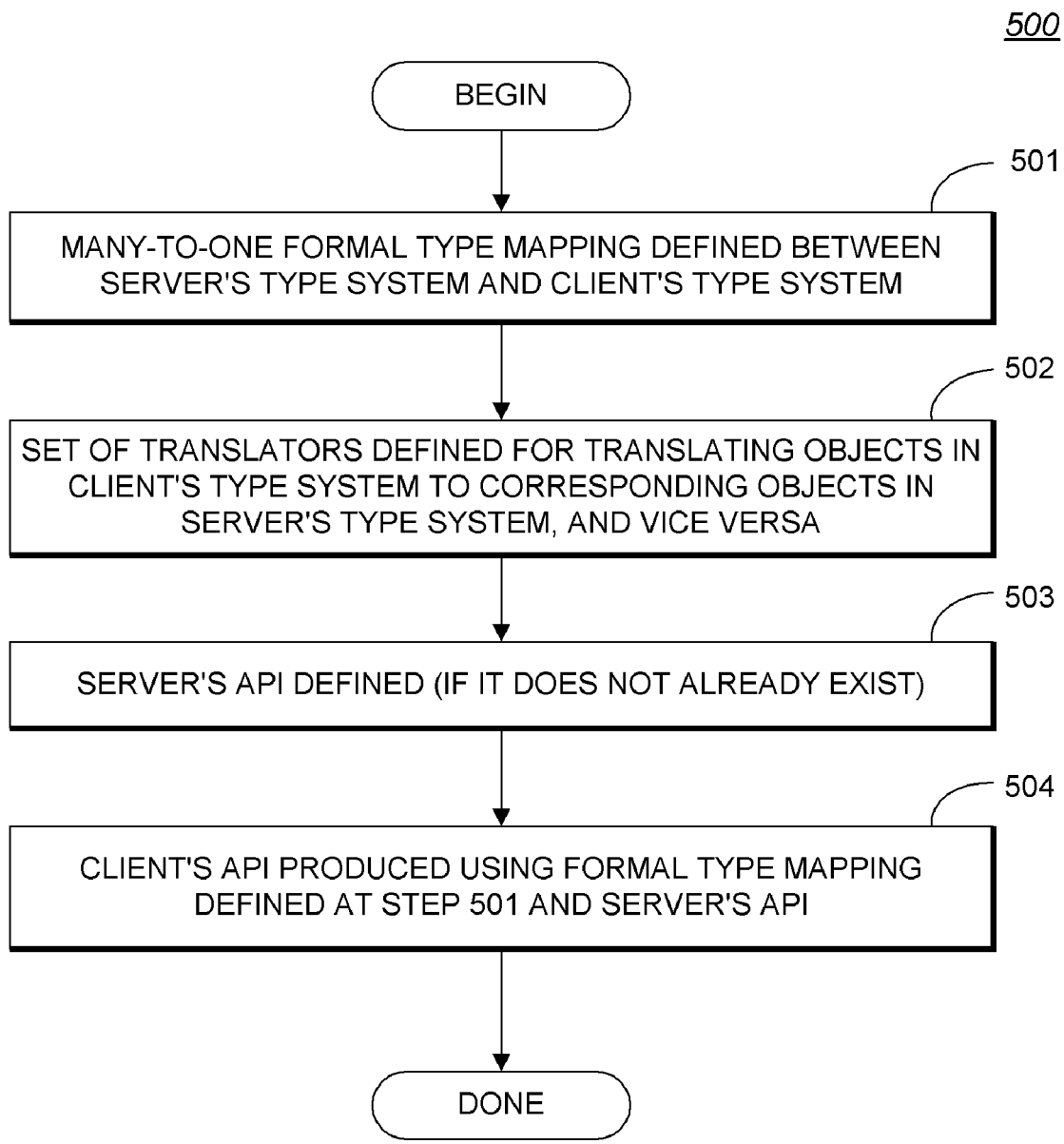
FIG. 5 is a single high-level flowchart illustrating the set up of the system of the present invention for type system translation across languages.

FIG. 5 is a single high-level flowchart 500 illustrating the set up of the system of the present invention for type system translation across languages. In the following discussion, it is assumed that a set of programming interfaces (i.e., an API) has been defined in the server's environment, and the client's programming interfaces are generated from those of the server. In fact, the role of client or server is arbitrary, and the server's API could just as well be generated from the client's API. Also, the following discussion uses an example of the operations involved in translating data types in the client's system into a format for invoking methods of a server. However, essentially the same steps may also be used at the server for translation into a format that is expected by the client.

At step 501, a many-to-one formal type mapping is defined between the server's type system and the client's type system. This formal type mapping is provided as part of the translation system of the present invention (e.g., based on a mapping between one or more pairs of languages such as C# and Java). The mapping is independent of the server's API, and is generally shared by all client-server interactions. This "formal" mapping comprises a mapping between the formal types used in the server API and the formal types used in the client API. The formal type is the type of a parameter (or return type) of a method, as indicated at program compilation time (also known as the static type). The formal type (or static type) is distinct from the actual type (or runtime type), which is the type of the actual object being passed to the method (or returned from the method) at runtime. In object-oriented programming languages, it is typical for the actual parameter to be a subclass of (or otherwise extend) the formal type. For example, if there is a method called "Drive" which takes a parameter of type "Car", a caller might want to invoke the method "Drive" using an object of type "Porsche", where "Porsche" is a subclass of "Car". In such a case, "Car" is the formal parameter type, and "Porsche" is the actual parameter type.

At step 502, a set of translators is also defined for translating objects in the client's type system to corresponding objects in the server's type system, and vice versa. The translators are also provided by the system of the present invention for translation of objects between one or more pairs of languages. Frequently, the data type translation will be concurrent with inter-process communication (e.g., between a client application on a first machine and a server application on a second machine as illustrated at FIG. 3). In this case the data type translation takes the form of marshaling code. That is, to translate a given object from the client's type system to the server's type system the object is (a) marshaled into a shared on-the-wire format by the client, (b) transferred from the client to the server by some form of middleware, and (c) unmarshaled from the shared on-the-wire format by the server. The code examples set forth below in this document (which are used to illustrate the operations of the present invention) are based on such a distributed system embodiment. However, it should be noted that the present invention could just as well be used in a non-distributed system environment, in which case the translation from the client's type system to the server's type system could be significantly optimized.

The next two steps are typically performed by a developer that is developing an application (e.g., a client application) using the system of the present invention. At step 503, the server's API is defined if it does not already exist. In the case of interacting with a legacy system, the server's API will already exist, in which case this step is omitted. The server's API generally comprises a set of methods passing and returning various types. All formal types referenced in the server's API should be supported by the formal type mapping defined at step 501. Optionally, the formal type mapping could be augmented to ensure full data type coverage.

At step 504, the client's API is produced using the formal type mapping defined at step 501 and the server's API which is defined at step 503 (or which already exists). This step of producing the client's API is purely mechanical, inasmuch as it requires simply applying the formal type mapping to each formal type in the server's API. Typically, this step would be performed by a code-generator, although the coding could be performed manually by the application developer, if desired. At this point the steps necessary to set up the translation system of the present invention as part of an application that is being developed is largely complete. The following discussion will describe the operations involved at runtime for selecting the appropriate translator and translating data types across programming languages.

Operations at Runtime

Figure 6A:
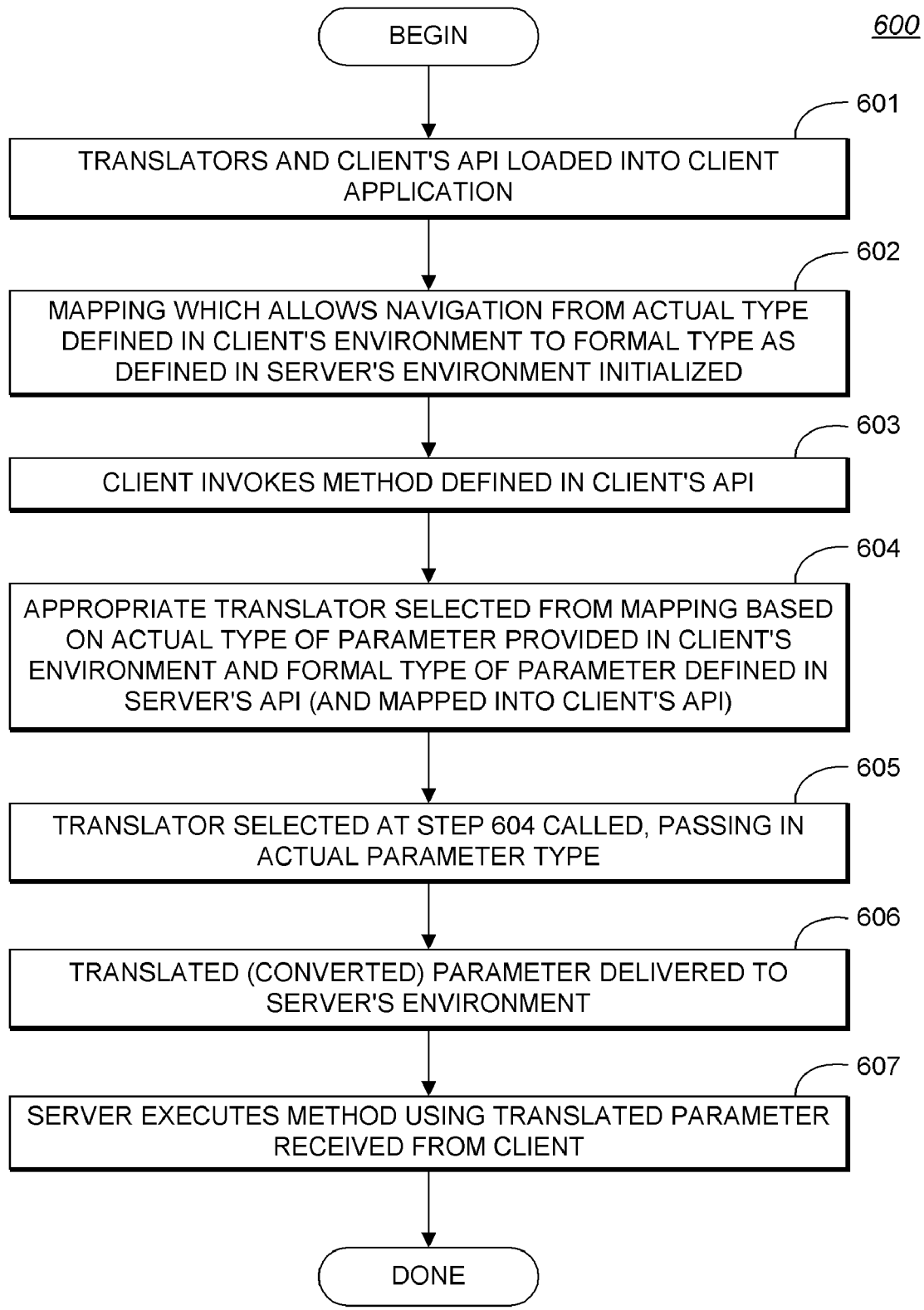
FIG. 6A is a high-level flowchart illustrating the operations of the system of the present invention at runtime in converting the actual type in the client's environment to a type compatible with the formal type expected by the server.

FIG. 6A is a high-level flowchart 600 illustrating the operations of the system of the present invention at runtime in converting the actual type in the client's environment to a type compatible with the formal type expected by the server. The first two steps are performed for initialization of the system when the application that has been developed using the system of the present invention (i.e., as described above) is started at runtime. At step 601, the Translators provided by the system of the present invention (i.e., as described above at step 502) and the client's API produced at step 504 (e.g., by the application developer) are loaded into the client application when the application is started at runtime.

Next, at step 602 a mapping which allows navigation from the actual type of the object as defined in the client's environment to the formal type as defined in the server's environment is initialized. The mapping that is initialized at this step 602 is used in operation for automatically determining the appropriate Translator to perform the translation between data types of the client and server. The mapping comprises a mapping from the tuple (actual type in client's environment, formal type in server's environment) to the corresponding Translator. The code to initialize this mapping is as follows:

```
3: Hashtable TypeMap = new Hashtable( );
4:
5: void RegisterTranslator(Translator translator) {
6:     Type actualType = translator.GetActualType( );
7:     Hashtable subMap = (Hashtable) TypeMap[actualType];
8:     if(subMap == null) {
9:         subMap = new Hashtable( );
10:        TypeMap[type] = subMap;
11:    }
12:    foreach(string formalType in translator.GetFormalTypes( )) {
13:        subMap[formalType] = translator;
14:    }
15: }
```

The above code for initialization of the mapping makes reference to the following type definition:

```
46: interface Translator {
47:
48:    /// Returns the C# datatype that is produced or written
49:    /// by this Translator. This method will be used to determine
50:    /// which translator to use when an object of a given C# type
51:    /// is written to the stream.
52:    Type GetActualType( );
53:
54:    /// Create an instance of the C# datatype supported by
55:    /// this Translator
56:    object Create( );
57:
58:    /// Read in the marshaled data for this datatype from
59:    /// the input stream.
60:    void Read(object obj, InputStream input);
61:
62:    /// Write the state of an instance of this datatype
63:    void Write(object obj, OutputStream output);
64:
65:    /// This method returns a list of type IDs that
66:    /// represent the list of formal types that this
67:    /// Translator supports
68:    string[ ] GetFormalTypes( );
69:
70: }
```

As shown, the above "Translator" interface provides three services: (i) a first mechanism to read and/or write an object from/to the on-the-wire format as discussed above (e.g., in the discussion of translators at step 502 at FIG. 5); (ii) a second mechanism to determine the actual type (in the client's type system) that a given Translator supports, and (iii) a third mechanism to determine the formal types (in the server's type system) that a particular Translator supports. The call to "GetActualType" at line 6 above (i.e., in the above code to initialize the mapping) uses the second mechanism to determine the actual type (in the client's type system) that a particular Translator supports. The call to "GetFormalTypes" at line 12 above uses the third mechanism to obtain a list of the formal types that a particular Translator supports.

The structure of a Translator is illustrated by the following partial listing of an implementation class for constructing, reading, and writing instances of the C# type "System.Collections.ArrayList" to or from a data stream:

```
72: /// Provides a translator for constructing, reading and writing
73: /// instances of type System.Collections.ArrayList from or to a
74: /// data stream.
75: class ArrayListTranslator : Translator {
76:
77:    Type GetActualType( ) {
78:        return typeof(System.Collections.ArrayList);
79:    }
80:
81:    object Create( ) {
82:        return new System.Collections.ArrayList( );
83:    }
84:
85:    void Read(object obj, InputStream input) { } //details omitted
86:
87:    void Write(object obj, OutputStream output) { } //details omitted
88:
89:    string[ ] GetFormalTypes( ) {
90:        return new string[ ] {
91:            "java.util.ArrayList",
92:            "java.util.AbstractList",
93:            "java.util.AbstractCollection",
94:            "java.util.Collection",
95:            "java.util.List",
96:            "java.util.RandomAccess",
97:            "java.lang.Cloneable",
98:        };
99:    }
100:
101: }
```

It should be noted that in accordance with the methodology of the present invention, the above portion of the "ArrayListTranslator" class is provided by the system of the present invention (e.g., by implementation (or code generation) of the translator as provided at step 502). As well as being able to perform the actual act of translating types (which is performed by a combination of the "Create", "Read", and "Write" methods) the above Translator implementation also provides information needed for the mapping initialization performed at step 602. Essentially, this Translator indicates that it can be used in situations where the actual type in the client's environment is "System.Collections.ArrayList" (as indicated by the implementation of the method "GetActualType") and in situations where the formal type in the server's environment is one of the types listed in the "GetFormalTypes" method at lines 89-99 above (e.g., "java.util.ArrayList", "java.util.AbstractList", and so forth at lines 91-97).

In the introductory example, reference was made to a case in which a C# System.Collections.ArrayList could be translated to the Java type java.util.Vector, instead of being translated to the Java type java.util.ArrayList. This translation would be performed by a Translator similar to the above, which might be called "VectorTranslator". The differences between the "ArrayListTranslator" (listed above) and the "VectorTranslator" would be as follows: (a) "VectorTranslator" would list "java.util.Vector" (and its base types and interfaces) in its "GetFormalTypes" method, and (b) "VectorTranslator" would implement the Read and Write methods differently, as appropriate for translation to/from a java.util.Vector.

In the presently preferred embodiment, the Translator implementation classes are provided as part of the system. However, it should be noted that the Translator implementation classes can be partially or completely code generated. For example, the Translator implementation classes can be code generated based upon the formal type mapping (e.g., defined at step 501 at FIG. 5) and knowledge of the client's type system and the server's type system, which can be obtained via runtime type introspection.

After the above initialization steps are performed, the functionality provided by the present invention may be invoked as the client application executes at runtime. At step 603, the client invokes a method defined in the client's API (i.e., the client's API as defined at step 504 at FIG. 5). In response, the appropriate Translator is selected at step 604 based on (i) the actual type of the parameter as provided in the client's environment, and (ii) the formal type of the parameter as defined in the server's API (and mapped into the client's API). The routine for selecting the appropriate Translator is described below in greater detail and illustrated at FIG. 6B.

At step 605, the Translator selected at step 604 is called, passing in the actual parameter type (i.e., the type of the parameter passed when the method defined in the client's API was invoked). In this example, the "Write" method of the Translator (e.g., as illustrated above at lines 63 and 87) would be called for converting the actual parameter in the client's environment to the shared on-the-wire format corresponding to the formal type expected in the server's environment. Next, at step 606 the translated (converted) parameter is delivered to the server's environment. At step 607, the server executes the method using the trans-lated parameter received from the client.

Optionally, the server implements the same steps as provided above for sending data (e.g., returning data from execution of the method at the server) to the client. As previously discussed, the methodology of the present invention is essentially the same at the client and at the server and a symmetric series of operations may be performed at the server (e.g., for returning values provided by the server to the client in the format expected by the client). The process of selecting a Translator is described in further detail below.

Figure 6B:
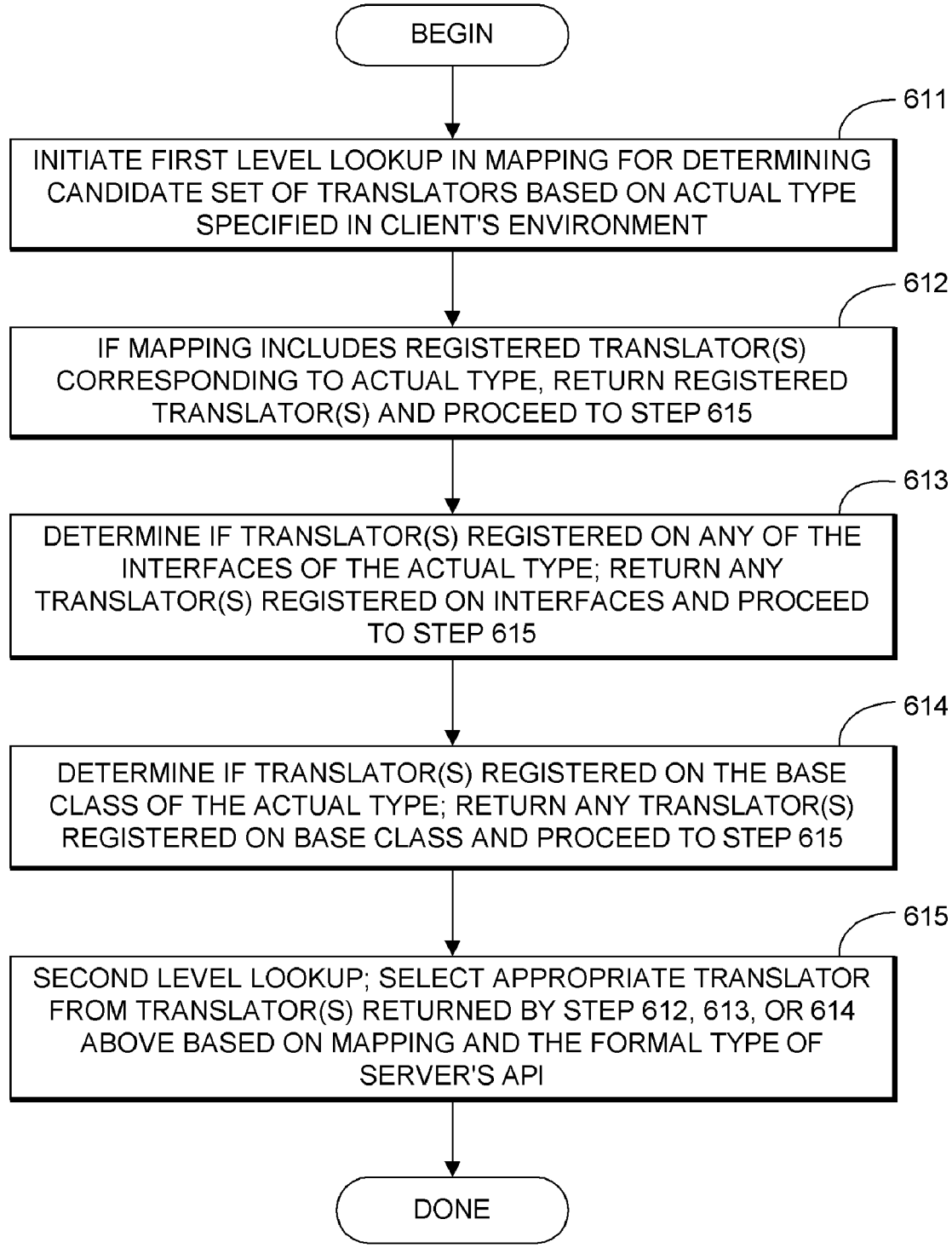
FIG. 6B is a flowchart illustrating how the system selects an appropriate Translator for converting the actual type in the client's environment to a type compatible with the formal type expected by the server.

FIG. 6B is a flowchart 604 (corresponding to step 604 of FIG. 6A) illustrating how the system selects an appropriate Translator for converting the actual type in the client's environment to a type compatible with the formal type expected by the server. The appropriate Translator is selected based on (i) the actual type of the parameter as provided in the client's environment, and (ii) the formal type of the parameter as defined in the server's API (and mapped into the client's API). The routine for selecting (looking up) the Translator is as follows:

```
17: object LookupInMap(Type actualType, Hashtable map)
    {
18:    object result = map[actualType];
19:    if(result != null) {
20:       return result;
21:    }
22:    // look for a mapping in the interfaces supported by
the type
23:    foreach(Type t in actualType.GetInterfaces( )) {
24:       object result = map[t];
25:       if(result != null) {
26:          return result;
27:       }
28:    }
29:    // look for a mapping in the base types of the type
30:    for(Type t = actualType.BaseType; t != null; t = t.BaseType) {
31:       object result = map[t];
32:       if(result != null) {
33:          return result;
34:       }
35:    }
36:    return null;
37: }
38:
```

```
39: Translator LookupTranslator(Type actualType, string
formalType) {
40:    Hashtable subMap = (Hashtable)
41:       LookupInMap(actualType, TypeMap);
42:    return (Translator) subMap[formalType];
43: }
```

The above routine performs a two-level lookup, as required by the mapping created above. The first level is illustrated above at lines 40-41 for determining a candidate set of Translators. As shown, the set of Translators are determined through a call to "LookupinMap" based upon the actual type ("actualType") provided by the client. The second level is illustrated at line 42, wherein a particular Translator is selected from the set based upon the formal type ("formalType") required by the server (and previously mapped to the client's API). The specific steps are as follows.

At step 611, the "LookupTranslator" method initiates the first level lookup for determining a candidate set of Translators through a call to "LookupinMap" (lines 40-41), which looks up the specified actual type in the "TypeMap". The first level lookup (as implemented by "LookupinMap") is somewhat complex, because it must consider the full inheritance hierarchy of the actual type. At step 612, if the mapping includes one or more registered Translator(s) corresponding to the actual type, these registered Translator(s) are returned (for use in the second level lookup) and the method proceeds to step 615. As shown above at lines 18-21, a lookup is performed based simply on the actual type. If there are Translator(s) registered corresponding to the actual type (i.e., if the result is not null at line 19), then these registered Translator(s) are returned.

If no Translators registered for the actual type are located at step 612, then the method proceeds to step 613 to determine if any Translator(s) are registered on any of the interfaces of the actual type. If so, then the set of Translators that is located is returned and the method proceeds to step 615. The code which looks for Translators registered on any of the interfaces of the actual type is shown above at lines 22-28. If one or more Translator(s) are found as a result of this search, they are returned as provided at line 26. However, if none are found, the search proceeds at step 614 by looking for Translators registered on the base class of the actual type. As shown at lines 29-35, the search proceeds by determining if any Translators are registered on the base class of the actual type. If any are found, the set of Translators is returned as provided at line 33. This search is performed iteratively until reaching the root of the type system (e.g., where "t.BaseType==null"). It should be noted that although the currently preferred embodiment provides for checking for Translators registered on the interfaces of the actual types before checking for Translators registered on the base class, in an alternative embodiment these steps could be reversed (i.e., step 614 performed before step 613).

If any of the above lookups succeed (e.g., a set of Translators is located at step 612, step 613, or step 614) the method "LookupinMap" returns the set that was found. The second level lookup is then performed. At step 615, the appropriate Translator to use for this translation is selected from the set of Translators returned based on the mapping and the formal type of the parameter as defined in the server's API. This is illustrated above at line 42 as the method "LookupTranslator" returns the Translator corresponding to the formal type. The selected Translator is then used for performing a translation to the data type expected by the server.

While the invention is described in some detail with specific reference to a single-preferred embodiment and certain alternatives, there is no intent to limit the invention to that particular embodiment or those specific alternatives. For instance, the present invention is not specific to C# and/or Java and may also be used with a number of other programming languages. In addition, a client/server distinction is not necessary to the invention, but is used to provide a framework for discussion. Those skilled in the art will appreciate that modifications may be made to the preferred embodiment without departing from the teachings of the present invention.

What is claimed is:

1. A system for translation of data types between a first application in a first language and a second application in a second language, the system comprising:
    a computer having at least one processor and a memory configured to generate:
    a formal mapping between data types of the first language and data types of the second language;
    translators for translating data types between the first language and the second language based on the formal mapping;
    a translation mapping to the translators based on actual data types of the first application and formal data types of the second application; and
    a module for automatically selecting an appropriate translator for translating between a particular data type in the first language and a data types in the second language based on the translation mapping in response to invocation of a method of the first application with the particular data type,
    wherein the module for selecting the appropriate translator is configured to perform at least a two-level lookup in the translation mapping to select the appropriate translator,
    wherein a first level of the two-level lookup includes a lookup of a full inheritance hierarchy of the actual type to determine a candidate set of translators and,
    wherein a second level lookup of the two-level lookup includes a lookup based on a formal data type of the second application and selection of an appropriate translator from the candidate set of translators determined by the first level of the two-level lookup.

2. The system of claim 1, wherein the first language comprises C# and the second language comprises a language that is configured to conform with a JAVA language specification.

3. The system of claim 1, wherein the formal mapping comprises a mapping between formal types of the first language and formal types of the second language.

4. The system of claim 3, wherein the formal types comprise static types.

5. The system of claim 1, wherein the formal mapping comprises a many-to-one mapping.

6. The system of claim 1, wherein the translators marshal translated data into a wire format for transfer from the first application to the second application across a network.

7. The system of claim 1, wherein the translators read data of a first type and write data of a second type.

8. The system of claim 1, wherein the translators include a mechanism for determining the actual type in the first language that a particular translator supports.

9. The system of claim 1, wherein the translators include a mechanism for determining the formal type in the second language that a particular translator supports.

10. The system of claim 1, wherein the translators provide information needed for creating the translation mapping.

11. The system of claim 1, wherein the translators translate return values received from the second application into a format appropriate for the first application.

12. The system of claim 1, wherein the translation mapping provides for navigation from an object of the first application to a formal type of the second application's environment.

13. The system of claim 1, wherein the translation mapping comprises a mapping from actual type of the first application and formal type of the second application to a particular translator.

14. The system of claim 1, wherein the two-level lookup includes a first level lookup based on an actual data type of the first application.

15. The system of claim 1, wherein the module for selecting an appropriate translator determines if the mapping includes at least one translator for the particular data type.

16. The system of claim 1, wherein the module for selecting an appropriate translator determines if the mapping includes at least one translator for interfaces of the particular data type.

17. The system of claim 1, wherein the module for selecting an appropriate translator determines if the mapping includes at least one translator for base types of the particular data type.

18. A method for translation of data types between a first component in a first language and a second component in a second language, the method comprising:
    using a computer having a processor and a memory, the computer being configured to:
    define a formal mapping between data types of the first language and data types of the second language;
    implement translators based on the formal mapping for translating data types between the first language and the second language;
    produce a programming interface for the first component based upon the formal mapping and the second component's programming interface;
    generate a translation mapping to the translators based on actual data types of the first component and formal data types of the second component as defined in the first component's programming interface;
    in response to invocation of a method defined in the first component's programming interface with a particular data type, automatically select translator based on the translation mapping and the particular data type; and
    translate the particular data type to a data type of the second language using the selected translator,
    wherein automatically selecting the translator includes performing a two-level lookup in the translation mapping,
    wherein performing a first level of the two-level lookup includes looking up a full inheritance hierarchy of the actual type to determine a candidate set of translators, and
    wherein performing a second level of the two-level lookup includes a lookup based on a formal data type of the second component and selection of an appropriate translator from the candidate set of translators determined by the first level of the two-level lookup.

19. The method of claim 18, wherein the first component comprises an application on a first machine and the second component comprises an application on a second machine.

20. The method of claim 18, wherein the first component comprises a first component of an application and the second component comprises a second component of the application.

21. The method of claim 18, wherein the first component and the second component operate within a single process.

22. The method of claim 18, wherein define formal mapping includes defining a mapping between formal types of the first language and formal types of the second language.

23. The method of claim 18, wherein define the formal mapping includes defining a many-to-one mapping.

24. The method of claim 18, wherein implemene the translators includes implementing a translator for marshaling translated data into a wire format for transfer from the first component to the second component across a network.

25. The method of claim 18, wherein implemene the translators includes implementing a translator reading data of a first type and writing data of a second type.

26. The method of claim 18, wherein implemene the translators includes indicating the actual type in the first language that a particular translator supports.

27. The method of claim 18, wherein implemene the translators includes indicating the formal type in the second language that a particular translator supports.

28. The method of claim 18, wherein generatee the translation mapping includes generating the translation mapping based, at least in part, on information provided by the translators.

29. The method of claim 18, wherein the translation mapping provides for navigation from an object of the first component to the formal type of the second component's environment.

30. The method of claim 18, wherein the translation mapping comprises a mapping from actual type of the first component and formal type of the second component to a particular translator.

31. The method of claim 18, wherein the two-level lookup includes a first level lookup based on an actual data type of the first component.

32. The method of claim 18, wherein automatically selecting the translator includes determining if the translation mapping includes at least one translator for the particular data type.

33. The method of claim 18, wherein automatically selecting the translator includes determining if the translation mapping includes at least one translator for interfaces of the particular data type.

34. The method of claim 18, wherein automatically selecting the translator includes determining if the translation mapping includes at least one translator for base types of the particular data type.

35. The method of claim 18, further comprising:
translating return values received from the second component into a data type of the first component's environment using the selected translator.

36. The method of claim 18, wherein the first language is C# and the second language is a language that is configured to conform with a Java language specification.

37. The method of claim 18, wherein the second language is C# and the first language is a language that is configured to conform with a Java language specification.

38. The method of claim 18, further comprising:
copying to a computer-readable medium processor-executable instructions for performing the method of claim 18; and
executing said processor-executable instructions upon placement of the computer-readable medium in a computer.

39. The method of claim 18, further comprising:
downloading a set of processor-executable instructions for performing the method of claim 18; and
executing said processor-executable instructions in a computer upon completion of the downloading step.

* * * * *